July 13, 1926.

J. BRYCE 1,592,336

GLASS MELTING CONTAINER

Filed Jan. 30, 1923

WITNESSES
J. Herbet Bradley.

INVENTOR
James Bryce
By Green and McCallister
His Attorneys.

Patented July 13, 1926.

1,592,336

UNITED STATES PATENT OFFICE.

JAMES BRYCE, OF PITTSBURGH, PENNSYLVANIA.

GLASS-MELTING CONTAINER.

Application filed January 30, 1923. Serial No. 615,828.

This invention relates to the manufacture of glass and more particularly to receptacles or containers in which to melt glass batches.

So far as I am aware, no one prior to my invention has ever used a ferrous metal or ferrous alloy container or receptacle in which to melt a glass batch. I believe that refractory materials such as clay and the like have been universally used as the materials from which the receptacles or containers for melting glass batches have been used. It has been universally believed that ferrous metals would disintegrate or otherwise break down in contact with the melting batch of glass forming materials and would enter into the glass principally in the form of color, rendering the same unsuitable for use.

Clay pots and crucibles as well as tanks and furnaces made from refractory materials are relatively short-lived, are of high upkeep cost and because of the fact that they become more or less incorporated in the molten glass therein, render it practically impossible to make a finished glass of a predetermined analysis.

An object of this invention is to produce a container or receptacle such as a pot, crucible, furnace or tank within which a glass batch may be melted without any appreciable deterioration or loss in the container or receptacle.

A further object is to produce a metal container or receptacle for melting glass.

A still further object is to produce a ferrous alloy container or receptacle which will be rugged and of great life when used for melting glass or for reducing glass batches to molten glass.

By experimenting, I have found that a ferrous alloy containing a relatively high percentage of chromium will resist appreciable oxidation when in contact with the elements or substances entering into a glass batch, and while such elements and substances are melted to form molten glass.

An alloy having the desired resistances to oxidation at those temperatures necessary to reduce a glass batch to molten glass contains from 25 to 45% of chromium and from 73 to 53% of iron. The remainder of the alloy may comprise carbon, silicon, with possibly traces of manganese, sulphur, phosphorous, copper and other elements forming the usual impurities in iron.

The alloy can be cast into the form of a pot or into the form of a crucible or may be rolled into plates from which tanks or furnaces may be fabricated.

Figure 1:
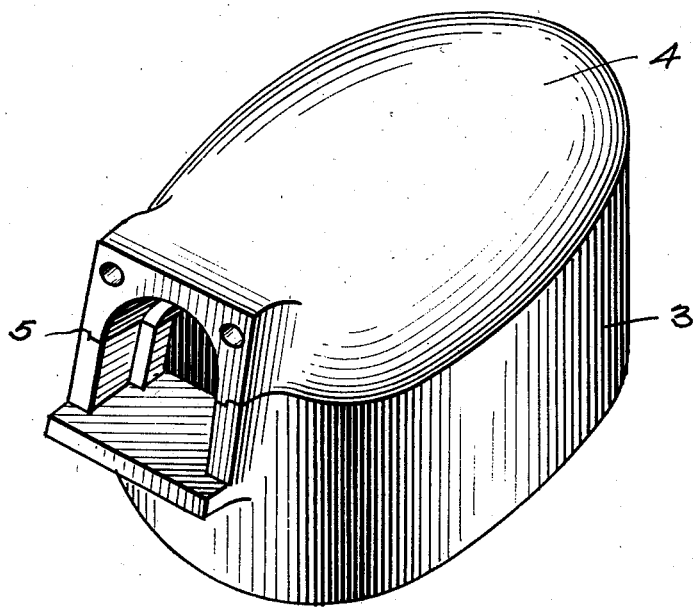
Figure 2:
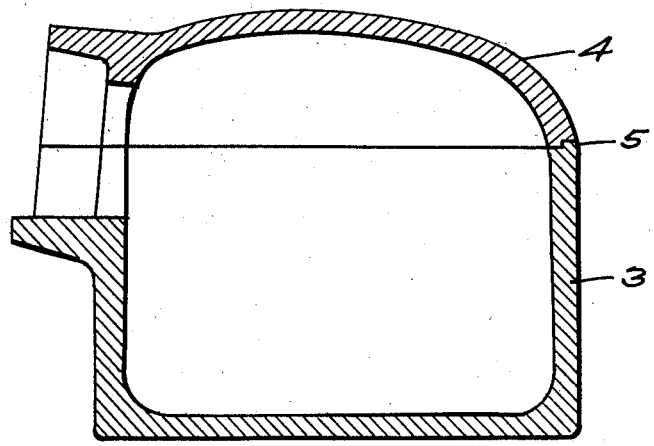

In the drawings forming part of this application, I have illustrated a glass pot which may be cast from an alloy such as I have described. In the drawings, Figure 1 is a view in perspective of such a pot and Fig. 2 is a view in section of the same.

Instead of forming the pot as an integral whole, as is now commonly done when formed from clay, the pot is preferably cast in two sections, a bottom section 3 and a top or cover section 4. A stepped joint as shown at 5 is preferably utilized so that the cover and bottom portions will be more or less locked in proper relative position.

With a ferrous alloy containing the percentages of chromium herein specified, the methods heretofore used for melting glass or glass batches can be greatly changed with material benefits both to the glass and as regards efficiency. Loss of heat can be reduced to a minimum and this, coupled with the fact that the container or receptacle whether it be pot, crucible, tank or furnace is practically indestructible, will materially reduce manufacturing costs. I have discovered that during the melting of the first batch in such a container of receptacle, a protective film or some sort is formed on the metal in contact with the molten glass and that this film apparently aids in preventing further oxidation or attack by the ingredients entering into the glass batch or the glass in molten state. I have also found that while the glass in the bottom of the receptacle may be discolored as is usual when using receptacles formed from refractory material, the remainder of the glass in the receptacle will be crystal clear unless coloring matter has been added.

The great advantages of this invention will at once appear to those skilled in the art.

Having thus described my invention, what I claim is:—

1. A container or receptacle in which to fuse the ingredients entering into a glass batch, which container is formed from a ferrous alloy containing a percentage of chromium such that oxidation of the surfaces of the container in contact with the ingredients during and after fusion thereof will be negligible.

2. A container or receptacle in which to fuse the ingredients entering into a glass batch which container is made from a ferrous alloy having a chromium content of between 25 and 45%.

In testimony whereof, I have hereunto subscribed my name this 25th day of January, 1923.

JAMES BRYCE.